(12) United States Patent
Yoda et al.

(10) Patent No.: US 12,269,514 B2
(45) Date of Patent: Apr. 8, 2025

(54) VEHICLE CONTROL DEVICE, VEHICLE, VEHICLE CONTROL METHOD AND STORAGE MEDIUM

(71) Applicant: HONDA MOTOR CO., LTD., Tokyo (JP)

(72) Inventors: Junya Yoda, Wako (JP); Katsuya Yashiro, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 288 days.

(21) Appl. No.: 17/945,487

(22) Filed: Sep. 15, 2022

(65) Prior Publication Data

US 2023/0014184 A1    Jan. 19, 2023

Related U.S. Application Data

(63) Continuation of application No. PCT/JP2021/011212, filed on Mar. 18, 2021.

(30) Foreign Application Priority Data

Mar. 25, 2020 (JP) ................ 2020-054883

(51) Int. Cl.
*B60W 60/00*      (2020.01)
*B60W 10/18*      (2012.01)
(Continued)

(52) U.S. Cl.
CPC ........ *B60W 60/0053* (2020.02); *B60W 10/18* (2013.01); *B60W 30/09* (2013.01);
(Continued)

(58) Field of Classification Search
CPC .. B60W 60/0053; B60W 10/18; B60W 30/09; B60W 50/14; B60W 2554/402;
(Continued)

(56) References Cited

U.S. PATENT DOCUMENTS 11,148,683 B2    10/2021   Kaji et al.
11,235,766 B2     2/2022   Masui et al.
(Continued)

FOREIGN PATENT DOCUMENTS

JP    2005-182753 A    7/2005
JP    2019-061613 A    4/2019
(Continued)

OTHER PUBLICATIONS

International Search and Written Opinion for PCT/JP2021/011212 mailed Jun. 8, 2021. (partially translated).

*Primary Examiner* — Naeem Taslim Alam
(74) *Attorney, Agent, or Firm* — Thomas | Horstemeyer, LLP (57) ABSTRACT

A vehicle control device controls travel of a vehicle by performing state transition for a plurality of control states having different driving assistance levels based on vehicle surrounding information. The vehicle control device comprises: an acquisition unit configured to acquire the vehicle surrounding information; and a control unit configured to control the state transition and braking operation of the vehicle based on the information acquired by the acquisition unit, wherein, based on the information, the control unit is configured to transition from a first control state set for travel of the vehicle to a second control state with a lower driving assistance level in a case where it is determined that another vehicle is crossing a lane line in front of the vehicle in a lane where the vehicle is traveling.

9 Claims, 5 Drawing Sheets

(51) Int. Cl.
*B60W 30/09* (2012.01)
*B60W 50/14* (2020.01)

(52) U.S. Cl.
CPC ....... *B60W 50/14* (2013.01); *B60W 2050/146* (2013.01); *B60W 2552/10* (2020.02); *B60W 2554/402* (2020.02); *B60W 2554/80* (2020.02)

(58) Field of Classification Search
CPC ......... B60W 2554/80; B60W 2552/10; B60W 2050/146
See application file for complete search history.

(56) References Cited

U.S. PATENT DOCUMENTS

| | | |
|---|---|---|
| 2005/0125121 A1 | 6/2005 | Isaji et al. |
| 2016/0257342 A1* | 9/2016 | Ueda .................... B62D 15/026 |
| 2020/0223438 A1* | 7/2020 | Masui ................. B60W 30/162 |
| 2020/0283025 A1 | 9/2020 | Honda et al. |
| 2021/0146954 A1 | 5/2021 | Kaji et al. |
| 2022/0111842 A1 | 4/2022 | Masui et al. |

FOREIGN PATENT DOCUMENTS

| | | |
|---|---|---|
| JP | 2019-168814 A | 10/2019 |
| WO | 2018/221350 A1 | 12/2018 |
| WO | 2019/106788 A1 | 6/2019 |
| WO | 2021/193377 A1 | 9/2021 |

\* cited by examiner

VEHICLE CONTROL DEVICE, VEHICLE, VEHICLE CONTROL METHOD AND STORAGE MEDIUM

CROSS-REFERENCE TO RELATED APPLICATION(S)

This application is a continuation of International Patent Application No. PCT/JP2021/011212 filed on Mar. 18, 2021, which claims priority to and the benefit of Japanese Patent Application No. 2020-054883 filed on Mar. 25, 2020, the entire disclosures of which are incorporated herein by reference.

BACKGROUND OF THE INVENTION

Field of the Invention

The present invention relates to a vehicle control device, a vehicle, a vehicle control method and a storage medium.

Description of the Related Art

Japanese Patent Laid-Open No. 2005-182753 discloses vehicle driving assistance for determining whether a self-vehicle can pass by the side of a parked vehicle (shoulder vehicle) parked on a road shoulder and determining whether to perform automatic braking according to determination results.

However, when the self-vehicle is traveling in a control state of automated driving and there is a shoulder vehicle parked over a lane line of a traveling lane where the self-vehicle is traveling, a driving assistance level may transition to a lower control state and automatic braking may be activated. In such a case, when the control state transition and automatic braking overlap, automatic braking may be activated depending on a relative positional relationship between the self-vehicle and the other vehicle even when braking is not required, which may make a driver (occupant) feel uncomfortable.

The present invention is intended to provide vehicle control capable of transitioning a control state in a case where it is determined that another vehicle is crossing a lane line of a traveling lane where a vehicle is traveling, and controlling braking operation depending on whether or not a distance between the other vehicle and the vehicle in a vehicle width direction is less than a threshold.

SUMMARY OF THE INVENTION

According to one aspect of the present invention, there is provided a vehicle control device that controls travel of a vehicle by performing state transition for a plurality of control states having different driving assistance levels based on vehicle surrounding information, the device comprising: an acquisition unit configured to acquire the vehicle surrounding information; and a control unit configured to control the state transition and braking operation of the vehicle based on the information acquired by the acquisition unit, wherein, based on the information, the control unit is configured to: transition from a first control state set for travel of the vehicle to a second control state with a lower driving assistance level in a case where it is determined that another vehicle is crossing a lane line in front of the vehicle in a lane where the vehicle is traveling; control the braking operation of the vehicle depending on whether or not a distance between the other vehicle and the vehicle in a vehicle width direction is less than a threshold; transition from the first control state to the second control state and perform deceleration control by the braking operation in a case where the other vehicle is crossing a lane line and is approaching the vehicle while the distance in the vehicle width direction is less than the threshold; transition from the first control state to the second control state and control travel of the vehicle without performing deceleration control in a case where the other vehicle is crossing a lane line but is separated from the vehicle with the distance in the vehicle width direction being equal to or longer than the threshold; and maintain the first control state to control travel of the vehicle without performing deceleration control in a case where the other vehicle is not crossing a lane line and is separated from the vehicle with the distance in the vehicle width direction being equal to or longer than the threshold.

According to the present invention, it is possible to provide vehicle control capable of transitioning a control state in a case where it is determined that another vehicle is crossing a lane line of a traveling lane where a vehicle is traveling, and controlling braking operation depending on whether or not a distance between the other vehicle and the vehicle in a vehicle width direction is less than a threshold.

Further features of the present invention will become apparent from the following description of exemplary embodiments (with reference to the attached drawings).

DESCRIPTION OF THE EMBODIMENTS

Hereinafter, embodiments will be described in detail with reference to the accompanying drawings. Note that the following embodiments do not limit the invention defined in claims, and not all combinations of features described in the embodiments are essential to the invention. Two or more features described in the embodiments may be optionally combined together. In addition, identical or similar configurations are denoted by identical reference numerals, and redundant description will be omitted.

(Configuration of Vehicle Control Device)

Figure 1:
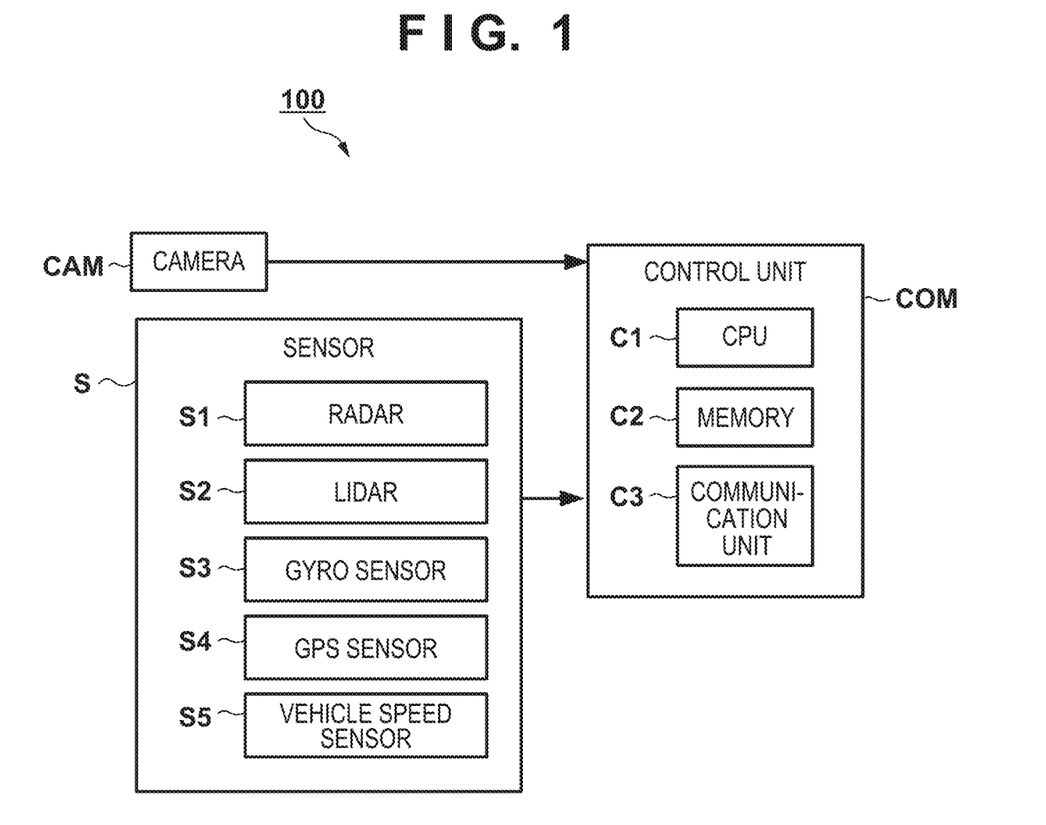
FIG. 1 is a block diagram illustrating a basic configuration of a vehicle control device.

FIG. 1 is a diagram illustrating an exemplified basic configuration of a vehicle control device that performs automated driving control of a vehicle (self-vehicle). The vehicle control device 100 includes a sensor S, a plurality of cameras CAM, and a computer COM. Examples of the sensor S include a plurality of radars S1, a plurality of LIDARs S2 (light detection and ranging), a gyro sensor S3, a GPS sensor S4, and a vehicle speed sensor S5. The sensor S and the camera CAM acquire information of the vehicle and various types of information around the vehicle, and input the acquired information to the control unit COM.

The control unit COM includes, for example, a CPU C1 that performs processing associated with automated driving control of the vehicle, a memory C2, and a communication unit C3 capable of establishing communication with an external device or a server on a network. The control unit COM performs image processing on information input from the sensor S (the radar S1 or the LIDAR S2) and the camera CAM, extracts a target object present near the vehicle, analyzes a type of the target object arranged near the vehicle, and monitors the target object.

Moreover, the gyro sensor S3 is capable of detecting a rotational motion and a posture of the vehicle, and the control unit COM is capable of determining a track of the vehicle based on, for example, detection results of the gyro sensor S3, and a vehicle speed detected by the vehicle speed sensor S5. The control unit COM is capable of acquiring a current location (location information) of the vehicle in map information and road information for a lane where the vehicle (self-vehicle) is traveling based on the detection results by the GPS sensor S4. Furthermore, the control unit COM is capable of acquiring road information regarding an area in which the number of lanes adjacent to a lane where the vehicle (self-vehicle) is traveling increases.

The control unit COM is capable of performing imaging processing on information input from the sensor S (radar S1, LiDAR S2) and the camera CAM, and detecting the other vehicle present in front of the vehicle using extracted information on a target object. The control unit COM is capable of performing automated driving control of the vehicle based on the information input from the sensor S and the camera CAM.

In a case where the vehicle control device shown in FIG. 1 is mounted on a vehicle, the control unit COM may be arranged, for example, in an ECU of a recognition processing system or an ECU of an image processing system that processes the information from the sensor S or the cameras CAM, may be arranged in an ECU that controls a communication device or an input/output device, or may be arranged in an ECU in a control unit that performs driving control of the vehicle or an ECU for automated driving control. For example, as illustrated in FIG. 2 described below, functions may be distributed to a plurality of ECUs constituting the vehicle control device 100, such as an ECU for the sensor S, an ECU for the camera, an ECU for the input/output device, and an ECU for automated driving control.

Figure 2:
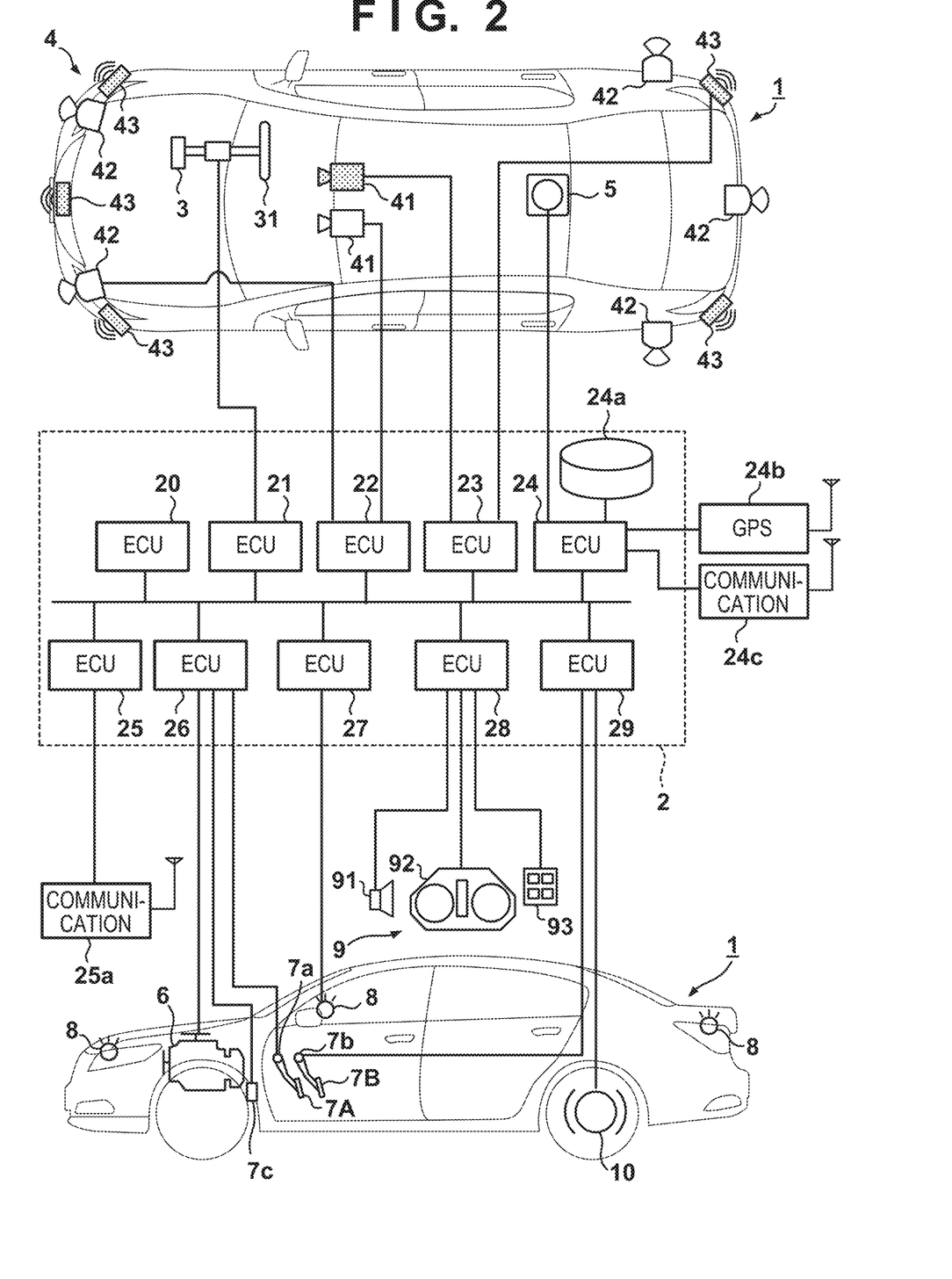
FIG. 2 is a control block diagram illustrating the vehicle control device.

FIG. 2 is a control block diagram of the vehicle control device 100 for controlling a vehicle 1. In FIG. 2, the vehicle 1 is schematically shown in a plan view and a side view. The vehicle 1 is, for example, a four-wheeled passenger vehicle such as a sedan.

The control unit 2 shown in FIG. 2 controls each unit of the vehicle 1. The control unit 2 includes a plurality of ECUs 20 to 29, which are communicably connected to each other via an in-vehicle network. Each ECU (electronic control unit) includes a processor represented by a CPU, a storage device such as a semiconductor memory, and an interface with an external device. The storage device stores, for example, programs to be executed by the processor, and data to be used by the processor for processing. Each ECU may include a plurality of processors, storage devices and interfaces.

Functions assigned to each of the ECUs 20 to 29 will be described here below. The number of ECUs and the functions assigned to the ECUs can be designed as appropriate for the vehicle 1, and can be subdivided or integrated when compared with the present embodiment.

The ECU 20 executes vehicle control related to automated driving of the vehicle 1 (self-vehicle) according to the present embodiment. For automated driving, at least one of steering and acceleration/deceleration of the vehicle 1 is automatically controlled. Processing regarding specific control for automated driving will be described later in detail.

The ECU 20 executes control related to automated driving of the vehicle 1. For automated driving, steering, lane change and acceleration or deceleration of the vehicle 1 are automatically controlled.

The ECU 21 controls an electric power steering device 3. The electric power steering device 3 includes a mechanism that steers front wheels in response to a driver's driving operation (steering operation) on a steering wheel 31. The electric power steering device 3 includes, for example, a motor that exerts a driving force for assisting with a steering operation or automatically steering the front wheels, and a sensor that detects a steering angle. In a case where a driving state of the vehicle 1 is automated driving, the ECU 21 automatically controls the electric power steering device 3 in response to instructions from the ECU 20, and controls a traveling direction of the vehicle 1.

The ECUs 22 and 23 control detection units 41 to 43 that detect a surrounding situation of the vehicle, and performs information processing of the detection results. The detection unit 41 has a configuration corresponding to the camera CAM shown in FIG. 1, and is an imaging device (hereinafter sometimes referred to as the camera 41) that detects an object in front of the vehicle 1 by imaging. In the present embodiment, the cameras 41 are installed inside of the windshield and in a front portion of a roof of the vehicle 1 such that images can be captured in the front of the vehicle 1. By analyzing images captured by the camera 41 (image processing), it is possible to extract an outline of a target object located in front of the vehicle 1 and a lane marking (e.g. white line) of a lane on a road.

A detection unit (LIDAR detection unit) 42 is a light detection and ranging (LIDAR) (hereinafter sometimes referred to as the LIDAR 42), detects a target object near the vehicle 1 by light, and measures a distance to the target object. The detection unit 42 (LIDAR 42) has a configuration corresponding to the LIDAR S2 shown in FIG. 1. In the present embodiment, five LIDARs 42 are provided, including one at each corner portion of a front part of the vehicle 1, one at the center of a rear part of the vehicle 1, and one at each lateral side of the rear part of the vehicle 1.

A detection unit (radar detection unit) 43 is a millimeter-wave radar (hereinafter sometimes referred to as the radar 43), detects a target object near the vehicle 1 by radio waves, and measures a distance to the target object. The detection unit 43 (radar 43) has a configuration corresponding to the radar S1 shown in FIG. 1. In the present embodiment, five radars 43 are provided, including one at the center of the front part of the vehicle 1, one at each corner portion of the front part of the vehicle 1, and one at each corner portion of the rear part of the vehicle 1.

The ECU 22 controls one camera 41 and each LIDAR 42, and performs information processing on detection results. The ECU 23 controls the other camera 41 and each radar 43, and performs information processing on detection results. Two sets of devices for detecting the surrounding situation of the vehicle improve the reliability of detection results, and different types of detection units such as cameras, LIDARs, and radars enable analysis of the surrounding environment of the vehicle in multiple ways.

The ECU 24 controls a gyro sensor 5, a Global Positioning System (GPS) sensor 24b, and a communication device 24c, and performs information processing on detection results or communication results. The gyro sensor 5 detects a rotational motion of the vehicle 1. A track of the vehicle 1 can be determined based on, for example, the detection results of the gyro sensor 5 and the wheel speed. The GPS sensor 24b detects a current location of the vehicle 1. The communication device 24c performs wireless communication with a server that provides map information and traffic information and acquires this information. The ECU 24 is capable of accessing a map information database 24a constructed in the storage device, and the ECU 24 searches for routes from the current location to a destination, for example. The database 24a may be built on a network, such that the communication device 24c can access the database 24a via the network, thereby acquiring information therefrom. The gyro sensor 5, the GPS sensor 24b and the communication device 24c respectively have configurations corresponding to a gyro sensor S3, a GPS sensor S4 and the communication unit C3 shown in FIG. 1. The ECU 25 is provided with a communication device 25a for vehicle-to-vehicle (V2V) communication. The communication device 25a wirelessly communicates with other nearby vehicles to exchange information between the vehicles.

The ECU 26 controls a power plant 6. The power plant 6 is a mechanism that outputs driving force for rotating driving wheels of the vehicle 1, and includes, for example, an engine and a transmission. For example, the ECU 26 controls an output from the engine in accordance with a driver's driving operation (pushing accelerators or acceleration operation) detected by an operation detection sensor 7a provided on an accelerator pedal 7A, and switches a gear ratio of the transmission based on information such as the vehicle speed detected by a vehicle speed sensor 7c (vehicle speed sensor S5 in FIG. 1). In a case where a driving state of the vehicle 1 is automated driving, the ECU 26 automatically controls the power plant 6 in response to an instruction from the ECU 20 and controls the acceleration and deceleration of the vehicle 1.

The ECU 27 controls a light device (headlight or taillight) including a direction indicator 8 (blinker). In the example shown in FIG. 1, the direction indicators 8 are provided at the front part, a door mirror, and the rear part of the vehicle 1.

The ECU 28 controls an input/output device 9. The input/output device 9 outputs information to the driver and receives information input from the driver. A voice output device 91 notifies the driver of information by a sound. A display device 92 notifies the driver of information by displaying an image. The display device 92 is arranged, for example, in front of a driver's seat and constitutes, for example, a console. Although the sound and the display have been given as examples here, information may be notified by vibration or light. Information may be notified by using a combination of some of sound, display, vibration, and light. Furthermore, the combination or the notification mode may vary depending on a level (for example, urgency level) of information that should be informed.

An input device 93 is a group of switches disposed at a place where the driver can operate them and is used to give an instruction to the vehicle 1. The input device 93 may also include a voice input device.

The ECU 29 controls a brake device 10 and a parking brake (not illustrated). The brake device 10 is, for example, a disc brake device, is provided on each wheel of the vehicle 1, and applies resistance against a rotation of the wheel to decelerate or stop the vehicle 1. The ECU 29 controls operations of the brake device 10 in response to a driving operation (braking operation) performed by the driver and detected by an operation detection sensor 7b provided on a brake pedal 7B, for example. In a case where a driving state of the vehicle 1 is the automated driving, the ECU 29 automatically controls the brake device 10 in response to an instruction from the ECU 20, and controls the deceleration and stopping of the vehicle 1. The brake device 10 and the parking brake can also operate to keep the vehicle 1 in a stopped state. In a case where the transmission of the power plant 6 includes a parking lock mechanism, the parking lock mechanism can also be operated to keep the vehicle 1 in the stopped state.

CONTROL EXAMPLE

Figure 3:
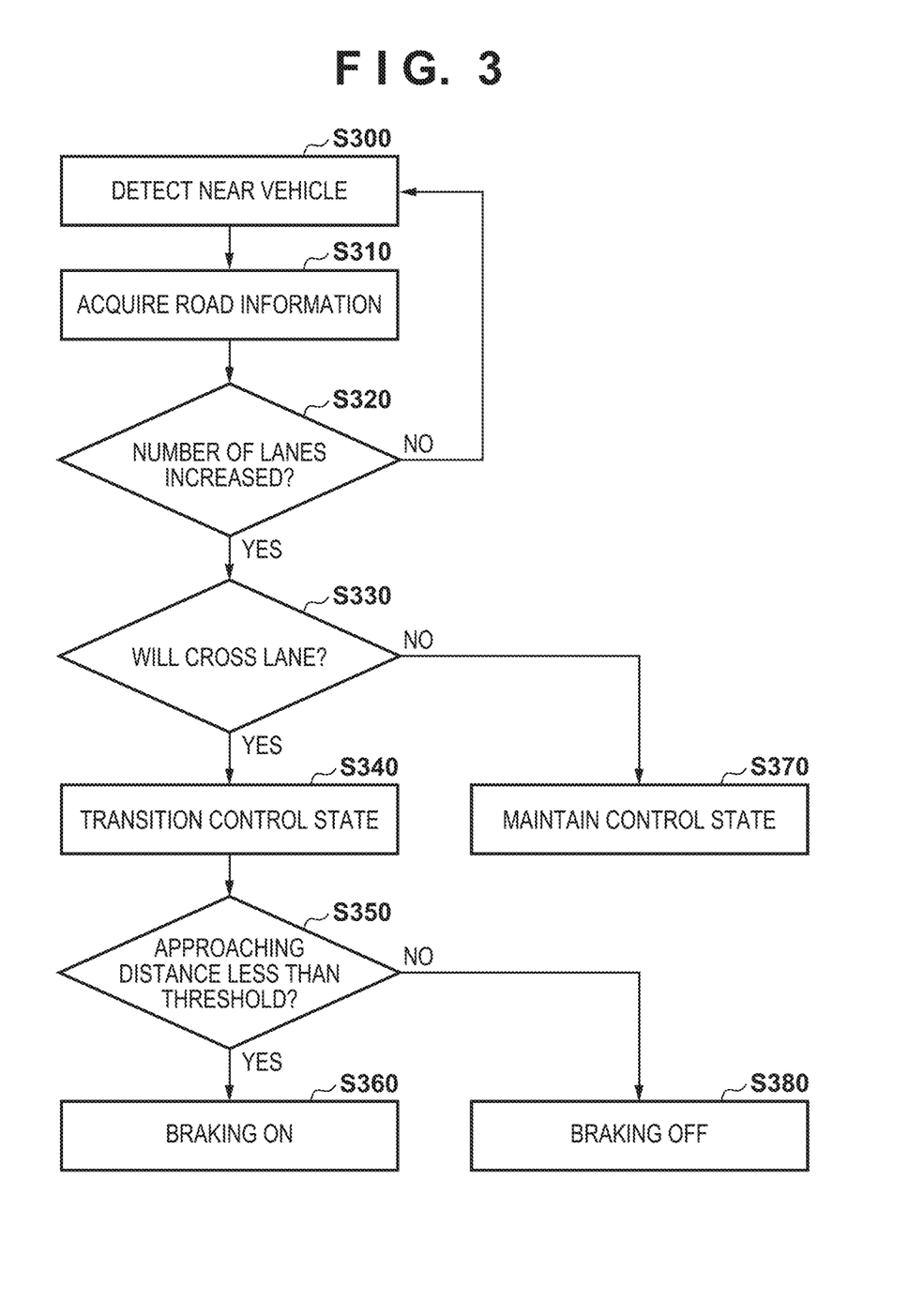
FIG. 3 is a flowchart illustrating processing of vehicle control according to an embodiment.
Figure 4:
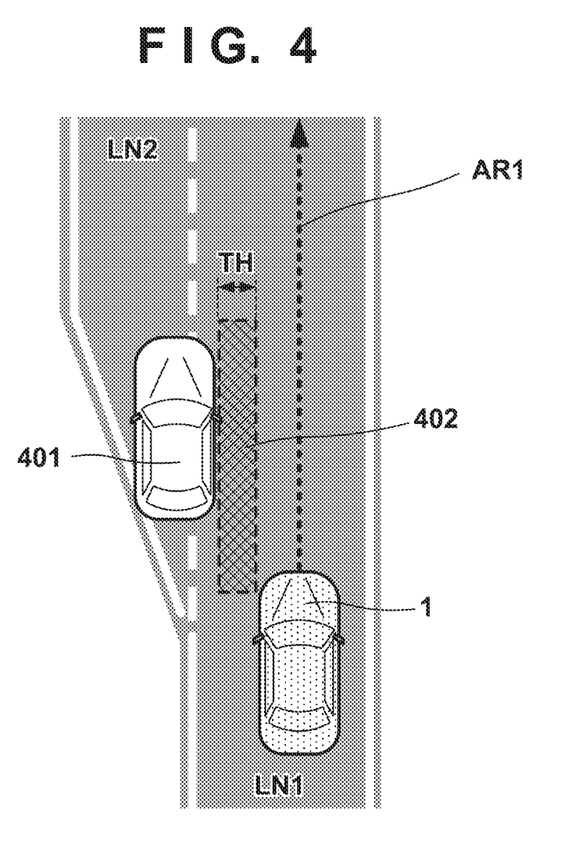
FIG. 4 is a diagram illustrating a method for setting a threshold.
Figure 5:
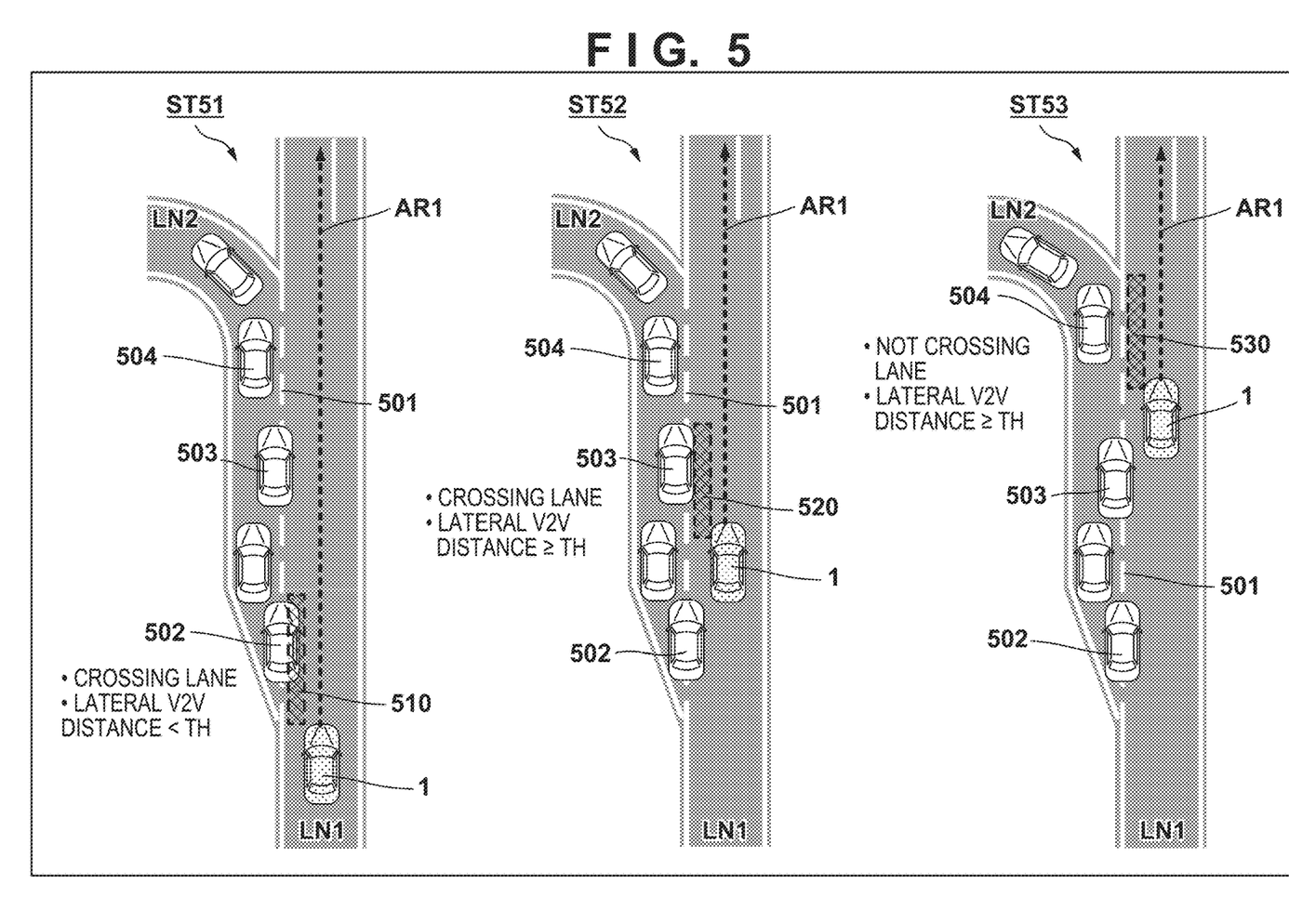
FIG. 5 is a diagram schematically illustrating vehicle control.

An exemplified vehicle control of the vehicle 1 executed by the ECU 20 will be described hereinbelow. FIG. 3 is a diagram illustrating a processing flow of vehicle control according to the embodiment, FIG. 4 is a diagram illustrating a method for setting of a threshold, and FIG. 5 is a diagram schematically illustrating vehicle control executed by the ECU 20. When instructions on a destination and automated driving are given by the driver, the ECU 20 automatically controls travel of the vehicle 1 toward the destination according to a route searched by the ECU 24 (for example, a lane (LN1) shown in FIG. 5). For automatic control, the ECU 20 acquires information related to the surrounding situation of the vehicle 1 from the ECUs 22 and 23, instructs the ECUs 21, 26 and 29 based on the acquired information, and controls steering, acceleration, constant speed running and deceleration control of the vehicle 1.

The ECU 22 controls one camera 41 and each LIDAR 42, and performs information processing on detection results. The ECU 23 controls the other camera 41 and each radar 43, and performs information processing on detection results. The ECU 20 executes control related to automated driving of the vehicle 1.

In step S300, the camera 41, each LIDAR 42 and each radar 43 detect the surroundings of the vehicle 1.

In step S310, the ECUs 22 and 23 function as the acquisition unit and acquire information on a detection area around the vehicle 1. The ECUs 22 and 23 (acquisition unit) acquire a current location (location information) of the vehicle in map information and road information for a lane where the vehicle (self-vehicle) is traveling based on the detection results of the GPS sensor S4. Further, the ECUs 22 and 23 (acquisition unit) acquire road information of the lane where the vehicle (self-vehicle) is traveling based on the map information. Furthermore, the ECUs 22 and 23 (acquisition unit) acquire road information regarding an area in which the number of lanes adjacent to a lane where the vehicle (self-vehicle) is traveling increases. FIG. 5 illustrates an example in which a lane LN2 adjacent to the lane LN1 where vehicle (self-vehicle) is traveling is connected as a branch as an example in which the number of lanes increases.

In step S320, the ECU 20 that executes control related to automated driving of the vehicle 1 functions as the control unit, and the ECU 20 (control unit) determines whether or not a traveling area of the vehicle 1 is an area where the number of lanes adjacent to the lane (traveling lane) where the vehicle 1 (self-vehicle) is traveling increases on the basis of information acquired by the ECUs 22 and 23 (acquisition unit).

In a case where the ECU 20 (control unit) determines that the area is not an area where the number of lanes adjacent to the lane (traveling lane) increases (NO in S320), the process returns to step S300, and the similar process is repeated. Meanwhile, in a case where the ECU 20 (control unit) determines that the area is an area where the number of lanes adjacent to the lane (traveling lane) increases in the determination of step S320 (YES in S320), the process proceeds to step S330. For the vehicle control of the present embodiment, in a case where the vehicle is traveling in the area where the number of lanes adjacent to the lane increases, state transition of the control state and braking operation control described below are performed.

In step S330, the ECU 20 (control unit) determines, based on the information acquired by the ECUs 22 and 23 (acquisition unit), whether or not the other vehicle is crossing a lane line of the lane LN1 in front of the vehicle 1 traveling in the lane LN1, and maintains the control state set for travel of the vehicle 1 in a case where there is no other vehicle crossing the lane line of the lane LN1 (NO in S330).

Meanwhile, in a case where the other vehicle is crossing the lane line of the lane LN1 (YES in S330) in the determination of step S330, the process proceeds to step S340.

In step S340, the ECU 20 (control unit) transitions the control state from a first control state set for the travel of the vehicle to a second control state having a lower driving assistance level.

The ECU 20 (control unit) is capable of controlling the travel of the vehicle 1 by state transition of control states having different driving assistance levels based on vehicle surrounding information. The control states of automated driving include the first control state and the second control state having different driving assistance levels (number of tasks requested to the driver). For example, as the driving assistance level, the first control state is a control state where the driver of the vehicle is not requested to grip a steering wheel, and the second control state is a control state where the driver is requested to grip the steering wheel.

In a case where the control state is transitioned from the first control state to the second control state, the ECU 20 (control unit) outputs a hands-on request (request to grip the steering wheel) as a request task to notify the driver of the state transition. The state transition can be notified by an output from the input/output device 9 under the control of the ECU 20 (control unit).

In step S350, the ECU 20 (control unit) sets a threshold region having a threshold in the vehicle width direction between the other vehicle present in front of the vehicle 1 and the vehicle 1 (self-vehicle). FIG. 4 is a diagram illustrating a method for setting a threshold region having a threshold in the vehicle width direction, which is a parameter for controlling braking operation. While the vehicle 1 is traveling in a direction indicated by an arrow AR1 on the lane LN1, a threshold region 402 having a threshold TH in the vehicle width direction is set between the other vehicle 401 present in front of the vehicle 1 and the vehicle 1 (self-vehicle). A length of the threshold region 402 in the longitudinal direction of the vehicle may be any length as long as it can include a length of the other vehicle in the longitudinal direction. The threshold TH in the vehicle width direction is a parameter for controlling braking operation. In a case where a distance L (lateral V2V distance) in the vehicle width direction between the other vehicle 401 and the vehicle 1 (self-vehicle) is equal to or longer than the threshold (NO in S350: L≥TH), the ECU 20 (control unit) proceeds the process to step S380, and controls the travel of the vehicle 1 in a state where the braking operation is not performed (turning off the brake) (S380).

Meanwhile, in a case where the distance L (lateral V2V distance) in the vehicle width direction between the other vehicle 401 and the vehicle 1 (self-vehicle) is less than the threshold and both vehicles are approaching (YES in S350: L<TH) in the determination of step S350, the ECU 20 (control unit) proceeds the process to step S360, and controls the travel of the vehicle 1 in a state where the braking operation is performed (turning on the brake) (S360).

The ECU 20 (control unit) can set the threshold TH, which is a parameter for controlling braking operation, to a different threshold in accordance with a type or size of the other vehicle. The ECU 20 (control unit) is capable of, based on the information acquired by the ECUs 22 and 23 (acquisition unit), identify a type or size of the other vehicle on the basis of at least one of a vehicle width and a vehicle length of the other vehicle, and set a different threshold based on the identified type or size. The type or size of the other vehicle includes, for example, a large vehicle, a middle vehicle and a small vehicle (light vehicle).

For example, a larger threshold TH (large) can be set in a case where the vehicle passes by the side of a large vehicle, a medium threshold TH (medium) can be set in a case where the vehicle passes by the side of a middle vehicle, and a small threshold TH (small) can be set in a case where the vehicle passes by the side of a small vehicle (light vehicle). When the vehicle passes by the side of the other vehicle, impression (discomfort) that vehicle occupants including the driver feel from the other vehicle may vary depending on the type and size of the other vehicle. For example, a large vehicle may give vehicle occupants a greater feeling of pressure than a small vehicle (light vehicle). By setting different thresholds depending on the type and size of the other vehicle as in the present embodiment, it is possible to reduce the impression (discomfort) that vehicle occupants feel from the other vehicle when the vehicle passes by the side of the other vehicle.

As illustrated in FIG. 5, when the vehicle 1 (self-vehicle) is traveling in the lane LN1, the threshold region 402 is set to have the threshold TH in the vehicle width direction as described with reference to FIG. 4. ST51 indicates a state where a threshold region 510 having a threshold TH in the vehicle width direction is set for the other vehicle 502 present front of the vehicle 1. In ST51, the other vehicle 502 is crossing a lane line of a lane 501 and approaching the vehicle 1 while a distance in the vehicle width direction is less than the threshold TH. In ST51, the ECU 20 (control unit) transitions from the first control state set for the travel of the vehicle 1 to the second control state with a lower driving assistance level (S340 in FIG. 3), and further controls the travel of the vehicle 1 in a state where braking operation is performed (turning on the brake) (S360 in FIG. 3).

ST52 indicates a state where a threshold region 520 having a threshold TH in the vehicle width direction is set for the other vehicle 503 present front of the vehicle 1. In ST52, the other vehicle 503 is crossing the lane line of the lane 501 but separated from the vehicle 1 while a distance in the vehicle width direction (lateral V2V distance) is equal to or longer than the threshold TH. In ST52, the ECU 20 (control unit) transitions from the first control state set for the travel of the vehicle 1 to the second control state with a lower driving assistance level (S340 in FIG. 3), and further controls the travel of the vehicle 1 in a state where the braking operation is not performed (turning off the brake) (S380 in FIG. 3).

With the state transition of the control state, the ECU 20 (control unit) outputs a hands-on request (request to grip the steering wheel) as a request task to notify the driver of the state transition. Consequently, it is possible to call the driver's attention, and suppress automatic braking operation in a state where braking is not required due to a relative positional relationship between the vehicle 1 (self-vehicle) and the other vehicle 503.

ST53 indicates a state where a threshold region 530 having a threshold TH in the vehicle width direction is set for the other vehicle 504 present front of the vehicle 1. In ST53, the other vehicle 504 is not crossing the lane line of the lane 501 and separated from the vehicle 1 while a distance in the vehicle width direction (lateral V2V distance) is equal to or longer than the threshold TH. In ST53, the ECU 20 (control unit) does not perform state transition from the first control state set for traveling of the vehicle 1 to the second control state with a lower driving assistance level, and controls the travel of the vehicle in a state where the first control state set for the current travel of the vehicle 1 is maintained (S370 in FIG. 3).

Since the state transition of the control state is not performed in ST53, the hands-on request (request to grip the steering wheel) is not output either. Accordingly, the vehicle 1 can travel while maintaining the control state set for the current travel state in a case where the state transition is not required due to a relative positional relationship between the vehicle 1 (self-vehicle) and the other vehicle 503, and it is possible to implement vehicle control in which discomfort is further reduced for the driver (occupant).

Modifications

In the control example described above, a case where the state transition is performed with the plurality of control states (first control state and second control state) having different driving assistance levels as the control state of automated driving has been described, but the vehicle control by the ECU 20 (control unit) is not limited to this example. For example, it is also possible to perform state transition from any one control state of automated driving to a control state of manual driving among a plurality of control states. In a case where it is determined that the other vehicle is crossing a lane line in front of the vehicle 1 in a lane where the vehicle 1 (self-vehicle) is traveling based on the information acquired by the ECUs 22 and 23 (acquisition unit) (for example, 502 in FIG. 5), the ECU 20 (control unit) transitions a control state of automated driving to a control state of manual driving. The ECU 20 (control unit) controls braking operation of the vehicle 1 depending on whether or not a distance in the vehicle width direction between the other vehicle and the vehicle 1 is less than a threshold. In this case, the braking operation control is similar to the control example described above, and the ECU 20 (control unit) does not perform braking operation in a case where the distance in the vehicle width direction between the other vehicle and the vehicle 1 is equal to or longer than the threshold, and performs braking operation in a case the other vehicle approaches the vehicle 1 with the distance less than the threshold.

Summary of Embodiment

The embodiments stated above disclose at least a vehicle control device, a vehicle including the vehicle control device, a vehicle control method of the vehicle control device, and a program as follows:
Configuration 1. The vehicle control device of the present embodiment is a vehicle control device (for example, 100 in FIG. 1) that controls travel of a vehicle (for example, 1 in FIG. 2) by performing state transition for a plurality of control states having different driving assistance levels based on vehicle surrounding information, the device including:
an acquisition unit (for example, ECUs 22 and 23) configured to acquire the vehicle surrounding information; and
a control unit (for example, ECU 20) configured to control the state transition and braking operation of the vehicle based on the information acquired by the acquisition unit (ECUs 22 and 23),
wherein, based on the information, the control unit (ECU 20) is configured to:
transition from a first control state set for travel of the vehicle to a second control state with a lower driving assistance level in a case where it is determined that another vehicle is crossing a lane line in front of the vehicle in a lane where the vehicle is traveling; and
control the braking operation of the vehicle depending on whether or not a distance between the other vehicle and the vehicle in a vehicle width direction is less than a threshold.

According to the vehicle control device of Configuration 1, it is possible to provide vehicle control capable of transitioning a control state in a case where it is determined that the other vehicle is crossing the lane line of the traveling lane where the vehicle is traveling, and controlling the braking operation depending on whether or not the distance between the other vehicle and the vehicle in the vehicle width direction is less than the threshold.
Configuration 2. The vehicle control device (100) of the present embodiment, the control unit (ECU 20) is configured not to perform the braking operation in a case where the distance in the vehicle width direction between the other vehicle and the vehicle is equal to or longer than the threshold, and performs the braking operation in a case the other vehicle approaches the vehicle with the distance less than the threshold.
Configuration 3. In the vehicle control device (100) of the present embodiment, the first control state is a control state where a driver of the vehicle (1) is not requested to grip a steering wheel, and the second control state is a control state where the driver is requested to grip the steering wheel, as the driving assistance level.
Configuration 4. In the vehicle control device (100) of the present embodiment, the control unit (ECU 20) is configured to notify the driver of the state transition.

According to the vehicle control device of Configurations 1 to 4, it is determined whether or not the distance in the vehicle width direction between the other vehicle and the vehicle (self-vehicle) is equal to or longer than the threshold, or whether or not the other vehicle is approaching the vehicle with the distance less than the threshold, and the braking operation can be controlled based on determination results. Consequently, in a case where the other vehicle does not interfere with the travel of the vehicle (self-vehicle) but is crossing the lane line, it is possible to alert the driver by notifying the driver of the state transition to lower a level of the control state while reducing uncomfortable feeling of the occupant by suppressing the deceleration control.
Configuration 5. In the vehicle control device (100) of the present embodiment, the control unit (ECU 20) is configured to control, based on the information acquired by the acquisition unit (ECUs 22 and 23), the state transition and the braking operation in a case where the vehicle is traveling in an area where the number of lanes adjacent to the lane increases.

According to the vehicle control device of Configuration 5, it is highly likely that a road with an increased number of lanes is a highway or a national highway with a higher speed limit and a broader width because it has a branch road or a plurality of lanes, and driving assistance level and automation level of an automated driving mode are often increased. In such a case, unnecessary deceleration control is suppressed, and a control state of higher driving assistance level is transitioned to a control state of lower driving assistance level, whereby vehicle control involving the driver more can be performed.

Configuration 6. In the vehicle control device (100) of the present embodiment, the control unit (ECU 20) is configured to, based on the information acquired by the acquisition unit (ECUs 22 and 23), identify a type or size of the other vehicle on the basis of at least one of a vehicle width and a vehicle length of the other vehicle, and set a different threshold based on the identified type or size.

When the vehicle passes by the side of the other vehicle, impression (discomfort) that vehicle occupants including the driver feel from the other vehicle may vary depending on the type and size of the other vehicle. According to the vehicle control device of Configuration 6, by setting different thresholds depending on the type and size of the other vehicle as in the present embodiment, it is possible to reduce the impression (discomfort) that vehicle occupants feel from the other vehicle when the vehicle passes by the side of the other vehicle.

Configuration 7. The vehicle control device of the present embodiment is a vehicle control device (for example, 100 in FIG. 1) that controls travel of a vehicle (for example, 1 in FIG. 2) by performing state transition for a plurality of control states based on vehicle surrounding information, the device including: an acquisition unit (for example, ECUs 22 and 23) configured to acquire the vehicle surrounding information; and a control unit (for example, ECU 20) configured to control the state transition and braking operation of the vehicle based on the information acquired by the acquisition unit (ECUs 22 and 23), wherein, based on the information, the control unit (ECU 20) is configured to:

transition from a control state of automated driving to a control state of manual driving in a case where it is determined that another vehicle is crossing a lane line in front of the vehicle in a lane where the vehicle is traveling; and control the braking operation of the vehicle depending on whether or not a distance between the other vehicle and the vehicle in a vehicle width direction is less than a threshold.

According to the vehicle control device of Configuration 7, in a case where the other vehicle is crossing the lane line of the traveling lane where the vehicle (self-vehicle) is traveling, and is approaching the vehicle while the distance between the other vehicle and the vehicle (self-vehicle) in the vehicle width direction is less than the threshold, the control state of automated driving is transitioned to the control state of manual driving, whereby it is possible to control the braking operation depending on whether or not the distance in the vehicle width direction between the other vehicle and the vehicle is less than the threshold while the driver travels the vehicle by themselves.

Configuration 8. The vehicle of the present embodiment is a vehicle (for example, 1 in FIG. 2), including a vehicle control device (for example, 100 in FIG. 1) that controls travel of a vehicle by performing state transition for a plurality of control states having different driving assistance levels based on vehicle surrounding information, the vehicle control device (100) including:

an acquisition unit (for example, ECUs 22 and 23) configured to acquire the vehicle surrounding information; and a control unit (for example, ECU 20) configured to control the state transition and braking operation of the vehicle based on the information acquired by the acquisition unit (ECUs 22 and 23), wherein, based on the information, the control unit (ECU 20) is configured to:

transition from a first control state set for travel of the vehicle to a second control state with a lower driving assistance level in a case where it is determined that another vehicle is crossing a lane line in front of the vehicle in a lane where the vehicle is traveling; and control the braking operation of the vehicle depending on whether or not a distance between the other vehicle and the vehicle in a vehicle width direction is less than a threshold.

According to the vehicle of Configuration 8, it is possible to provide the vehicle (for example, 1 in FIG. 2) having the vehicle control device (for example, 100 in FIG. 1) capable of transitioning the control state in a case where it is determined that the other vehicle is crossing the lane line of the traveling lane where the vehicle is traveling, and controlling braking operation depending on whether or not the distance between the other vehicle and the vehicle in the vehicle width direction is less than the threshold.

Configuration 9. A vehicle control method of the present embodiment is a vehicle control method for a vehicle control device (for example, 100 in FIG. 1) that controls travel of a vehicle (for example, 1 in FIG. 2) by performing state transition for a plurality of control states having different driving assistance levels based on vehicle surrounding information, the method including:

acquiring the vehicle surrounding information (for example, S300 and S310 in FIG. 3); and controlling the state transition and braking operation of the vehicle based on the acquired information (for example, S320 to S380 in FIG. 3), wherein, based on the information, the controlling includes:

transitioning from a first control state set for travel of the vehicle to a second control state with a lower driving assistance level in a case where it is determined that another vehicle is crossing a lane line in front of the vehicle in a lane where the vehicle is traveling (S340); and controlling the braking operation of the vehicle depending on whether or not a distance between the other vehicle and the vehicle in a vehicle width direction is less than a threshold (S360 and S380).

Configuration 10. A program of the present embodiment is a program to execute each step of a vehicle control method for a vehicle control device (for example, 100 in FIG. 1) that controls travel of a vehicle (for example, 1 in FIG. 2) by performing state transition for a plurality of control states having different driving assistance levels based on vehicle surrounding information, the vehicle control method including:

acquiring the vehicle surrounding information (for example, S300 and S310 in FIG. 3); and controlling the state transition and braking operation of the vehicle based on the acquired information (for example, S320 to S380 in FIG. 3), wherein, based on the information, the controlling includes:

transitioning from a first control state set for travel of the vehicle to a second control state with a lower driving assistance level in a case where it is determined that another vehicle is crossing a lane line in front of the vehicle in a lane where the vehicle is traveling (S340); and controlling the braking operation of the vehicle depending on whether or not a distance between the other vehicle and the vehicle in a vehicle width direction is less than a threshold (S360 and S380).

According to the vehicle control method of Configuration 9 and the program of Configuration 10, it is possible to provide vehicle control capable of transitioning a control state in a case where it is determined that the other vehicle is crossing the lane line of the traveling lane where the vehicle is traveling, and controlling the braking operation depending on whether or not the distance between the other vehicle and the vehicle in the vehicle width direction is less than the threshold.

OTHER EMBODIMENTS

The present invention can also be implemented by processing in which a program that implements functions in the embodiments stated above is supplied to a system or apparatus via a network or a storage medium, and one or more processors in the computer of the system or apparatus read and execute the program.

The invention is not limited to the foregoing embodiments, and various variations/changes are possible within the spirit of the invention.

What is claimed is:

1. A vehicle control apparatus that controls travel of a vehicle by performing state transition for a plurality of control states having different driving assistance levels based on vehicle surrounding information, the apparatus comprising:
at least one processor circuit with a memory comprising instructions, that when executed by the at least one processor circuit, cause the at least one processor circuit to at least:
acquire the vehicle surrounding information; and
control the state transition and braking operation of the vehicle based on the acquired information,
wherein, based on the acquired information, the instructions, when executed by the at least one processor circuit, further cause the at least one processor circuit to:
transition from a first control state set for travel of the vehicle to a second control state with a lower driving assistance level in a case where it is determined that another vehicle is crossing a lane line in front of the vehicle in a lane where the vehicle is traveling;
control the braking operation of the vehicle depending on whether or not a distance between the other vehicle and the vehicle in a vehicle width direction is less than a threshold;
transition from the first control state to the second control state and perform deceleration control by the braking operation in a case where the other vehicle is crossing the lane line and is approaching the vehicle while the distance in the vehicle width direction is less than the threshold;
transition from the first control state to the second control state and control travel of the vehicle without performing deceleration control in a case where the other vehicle is crossing the lane line but is separated from the vehicle with the distance in the vehicle width direction being equal to or longer than the threshold; and
maintain the first control state to control travel of the vehicle without performing deceleration control in a case where the other vehicle is not crossing the lane line and is separated from the vehicle with the distance in the vehicle width direction being equal to or longer than the threshold.

2. The vehicle control apparatus according to claim 1, wherein the first control state is a control state where a driver of the vehicle is not requested to grip a steering wheel, and the second control state is a control state where the driver is requested to grip the steering wheel, as the driving assistance level.

3. The vehicle control apparatus according to claim 1, wherein the instructions, when executed by the at least one processor circuit, further cause the at least one processor circuit to notify the driver of the state transition.

4. The vehicle control apparatus according to claim 1, wherein the instructions, when executed by the at least one processor circuit, further cause the at least one processor circuit to control, based on the acquired information, the state transition and the braking operation in a case where the vehicle is traveling in an area where the number of lanes adjacent to the lane where the vehicle is traveling increases.

5. The vehicle control apparatus according to claim 1, wherein the instructions, when executed by the at least one processor circuit, further cause the at least one processor circuit to, based on the acquired information, identify a type or size of the other vehicle on the basis of at least one of a vehicle width and a vehicle length of the other vehicle, and set a different threshold based on the identified type or size.

6. A vehicle control apparatus that controls travel of a vehicle by performing state transition for a plurality of control states based on vehicle surrounding information, the apparatus comprising:
at least one processor circuit with a memory comprising instructions, that when executed by the at least one processor circuit, cause the at least one processor circuit to at least:
acquire the vehicle surrounding information; and
control the state transition and braking operation of the vehicle based on the acquired information,
wherein, based on the acquired information, the instructions, when executed by the at least one processor circuit, further cause the at least one processor circuit to:
transition from a control state of automated driving to a control state of manual driving in a case where it is determined that another vehicle is crossing a lane line in front of the vehicle in a lane where the vehicle is traveling;
control the braking operation of the vehicle depending on whether or not a distance between the other vehicle and the vehicle in a vehicle width direction is less than a threshold;
transition from the control state of automated driving to the control state of manual driving and perform deceleration control by the braking operation in a case where the other vehicle is crossing the lane line and is approaching the vehicle while the distance in the vehicle width direction is less than the threshold;
transition from the control state of automated driving to the control state of manual driving and control travel of the vehicle without performing deceleration control in a case where the other vehicle is crossing the lane line but is separated from the vehicle with the distance in the vehicle width direction being equal to or longer than the threshold; and maintain the control state of automated driving to control travel of the vehicle without performing deceleration control in a case where the other vehicle is not crossing the lane line and is separated from the vehicle with the distance in the vehicle width direction being equal to or longer than the threshold.

7. A vehicle having a vehicle control apparatus that controls travel of a vehicle by performing state transition for a plurality of control states having different driving assistance levels based on vehicle surrounding information, the vehicle control apparatus comprising:

at least one processor circuit with a memory comprising instructions, that when executed by the at least one processor circuit, cause the at least one processor circuit to at least:

acquire the vehicle surrounding information; and control the state transition and braking operation of the vehicle based on the acquired information, wherein, based on the acquired information, the instructions, when executed by the at least one processor circuit, further cause the at least one processor circuit to:

transition from a first control state set for travel of the vehicle to a second control state with a lower driving assistance level in a case where it is determined that another vehicle is crossing a lane line in front of the vehicle in a lane where the vehicle is traveling;

control the braking operation of the vehicle depending on whether or not a distance between the other vehicle and the vehicle in a vehicle width direction is less than a threshold;

transition from the first control state to the second control state and perform deceleration control by the braking operation in a case where the other vehicle is crossing the lane line and is approaching the vehicle while the distance in the vehicle width direction is less than the threshold;

transition from the first control state to the second control state and control travel of the vehicle without performing deceleration control in a case where the other vehicle is crossing the lane line but is separated from the vehicle with the distance in the vehicle width direction being equal to or longer than the threshold; and maintain the first control state to control travel of the vehicle without performing deceleration control in a case where the other vehicle is not crossing the lane line and is separated from the vehicle with the distance in the vehicle width direction being equal to or longer than the threshold.

8. A vehicle control method for a vehicle control apparatus that controls travel of a vehicle by performing state transition for a plurality of control states having different driving assistance levels based on vehicle surrounding information, the method comprising:

acquiring the vehicle surrounding information; and controlling the state transition and braking operation of the vehicle based on the acquired information, wherein, based on the acquired information, the controlling includes:

transitioning from a first control state set for travel of the vehicle to a second control state with a lower driving assistance level in a case where it is determined that another vehicle is crossing a lane line in front of the vehicle in a lane where the vehicle is traveling;

controlling the braking operation of the vehicle depending on whether or not a distance between the other vehicle and the vehicle in a vehicle width direction is less than a threshold;

transitioning from the first control state to the second control state and performing deceleration control by the braking operation in a case where the other vehicle is crossing the lane line and is approaching the vehicle while the distance in the vehicle width direction is less than the threshold;

transitioning from the first control state to the second control state and controlling travel of the vehicle without performing deceleration control in a case where the other vehicle is crossing the lane line but is separated from the vehicle with the distance in the vehicle width direction being equal to or longer than the threshold; and maintaining the first control state to control travel of the vehicle without performing deceleration control in a case where the other vehicle is not crossing the lane line and is separated from the vehicle with the distance in the vehicle width direction being equal to or longer than the threshold.

9. A non-transitory computer readable storage medium for storing a program causing a computer to execute each step of a vehicle control method for a vehicle control apparatus that controls travel of a vehicle by performing state transition for a plurality of control states having different driving assistance levels based on vehicle surrounding information, the vehicle control method comprising:

acquiring the vehicle surrounding information; and controlling the state transition and braking operation of the vehicle based on the acquired information, wherein, based on the acquired information, the controlling includes:

transitioning from a first control state set for travel of the vehicle to a second control state with a lower driving assistance level in a case where it is determined that another vehicle is crossing a lane line in front of the vehicle in a lane where the vehicle is traveling;

controlling the braking operation of the vehicle depending on whether or not a distance between the other vehicle and the vehicle in a vehicle width direction is less than a threshold;

transitioning from the first control state to the second control state and performing deceleration control by the braking operation in a case where the other vehicle is crossing the lane line and is approaching the vehicle while the distance in the vehicle width direction is less than the threshold;

transitioning from the first control state to the second control state and controlling travel of the vehicle without performing deceleration control in a case where the other vehicle is crossing the lane line but is separated from the vehicle with the distance in the vehicle width direction being equal to or longer than the threshold; and maintaining the first control state to control travel of the vehicle without performing deceleration control in a case where the other vehicle is not crossing the lane line and is separated from the vehicle with the distance in the vehicle width direction being equal to or longer than the threshold.

\* \* \* \* \*